March 3, 1964 J. J. GILBERT 3,123,556
SEWAGE TREATMENT PLANTS
Filed Feb. 8, 1961 5 Sheets-Sheet 1

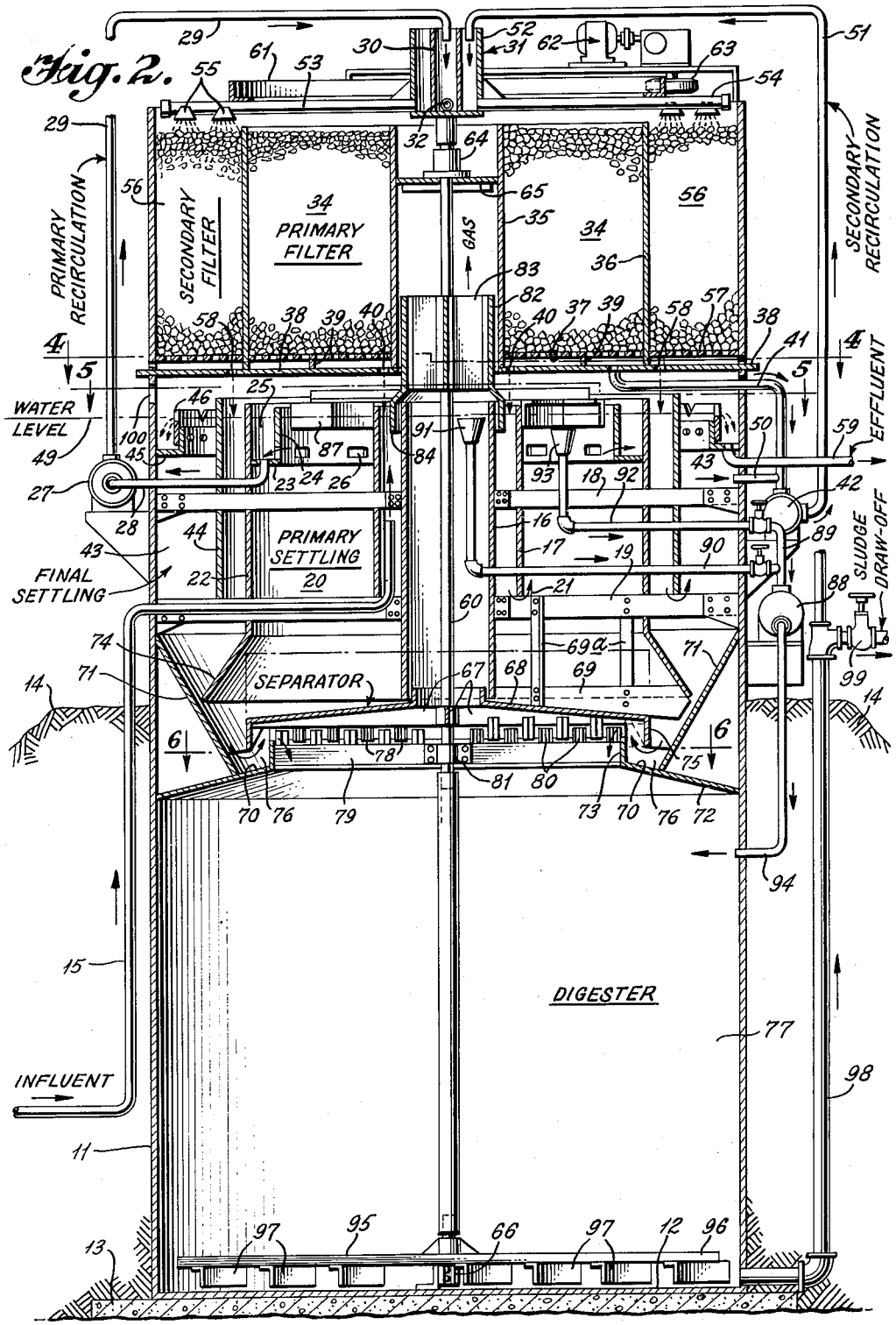

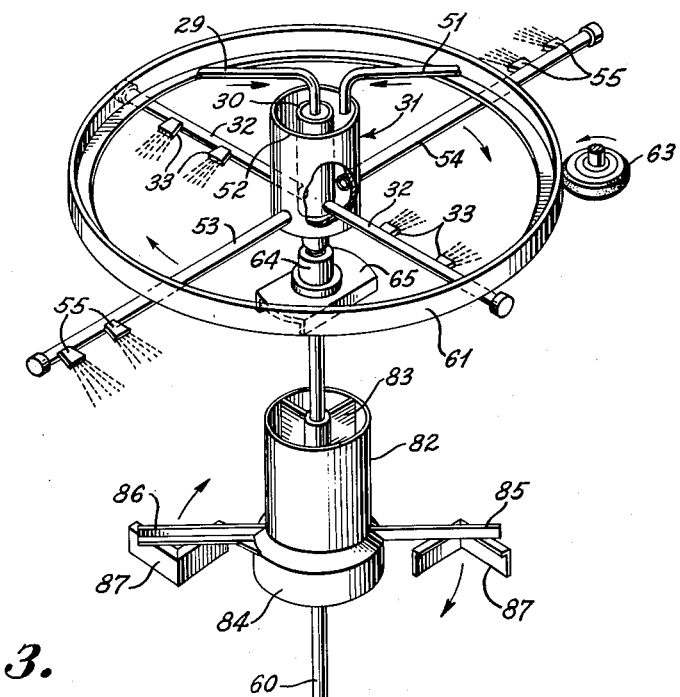

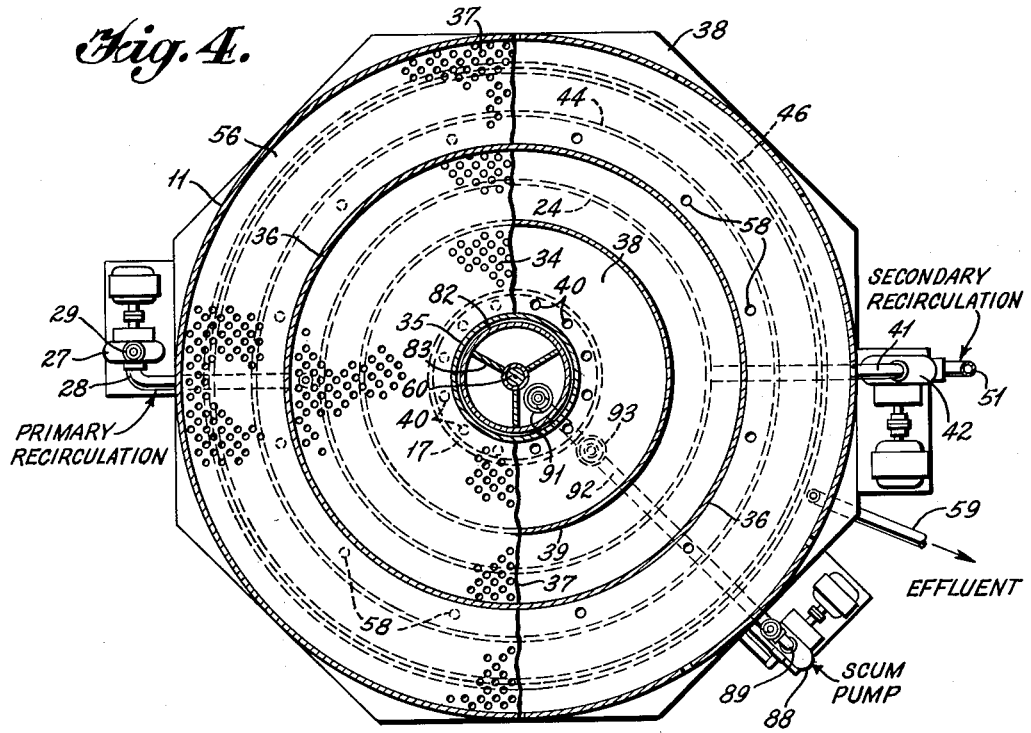
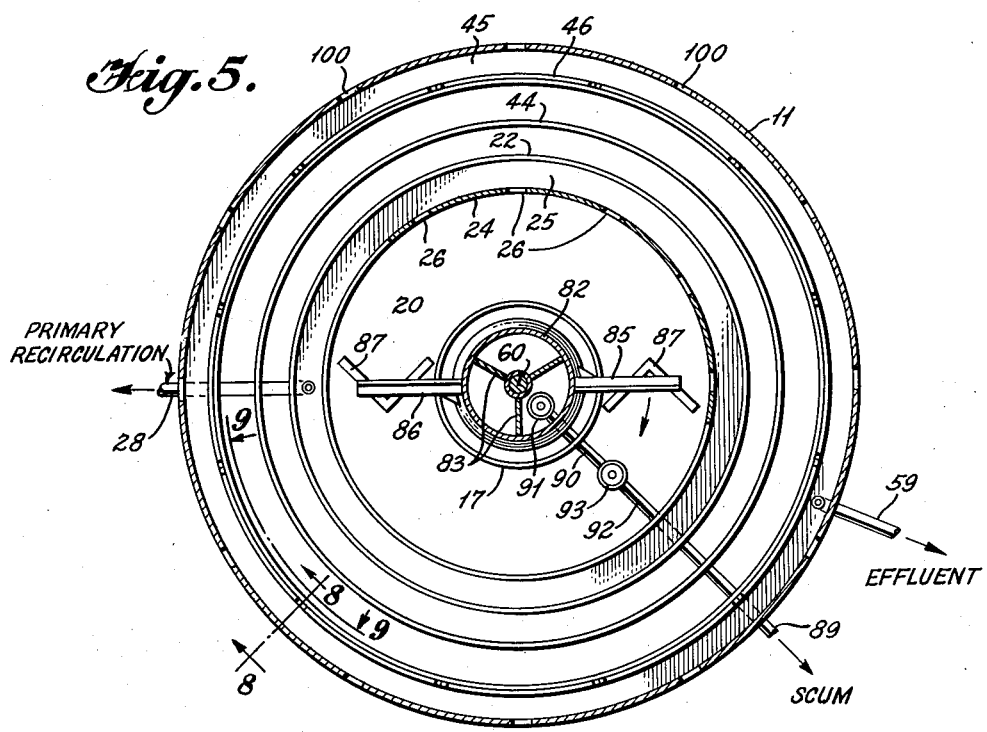

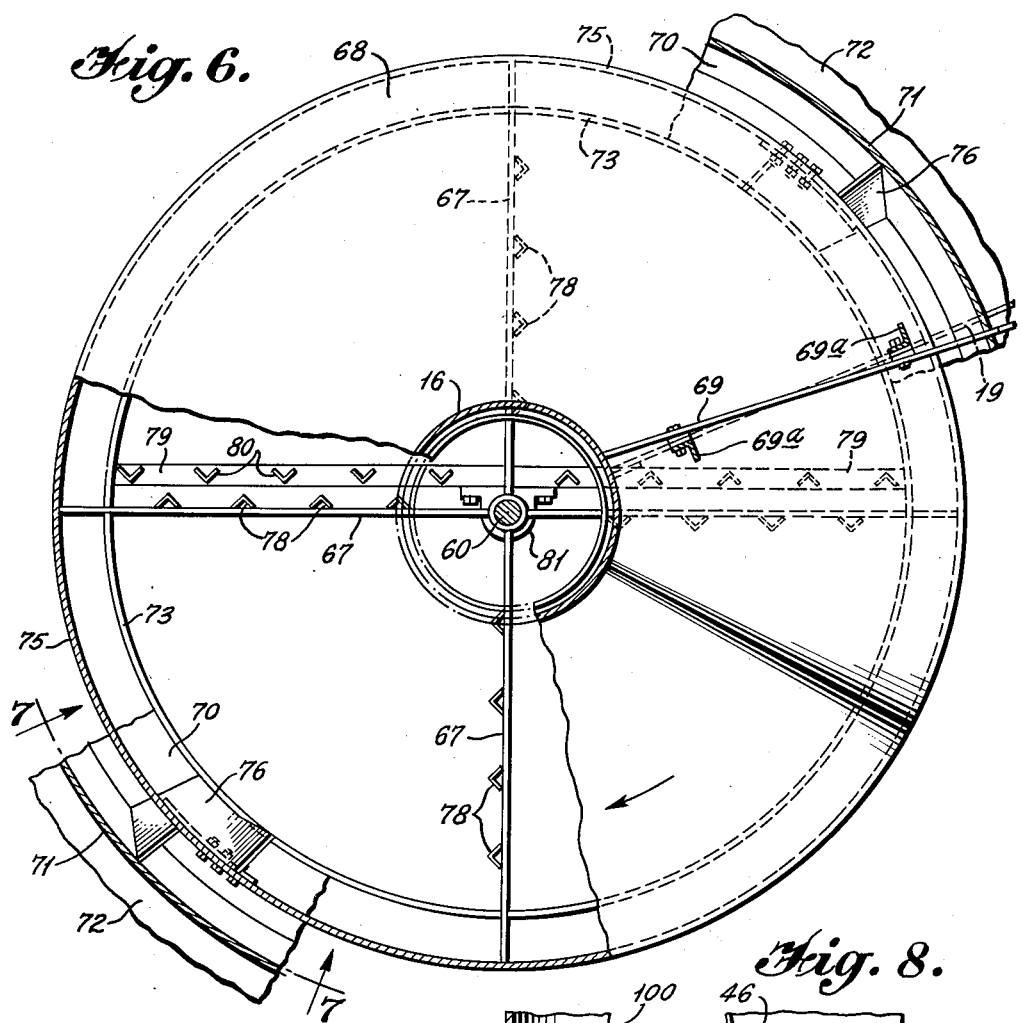

United States Patent Office 3,123,556
Patented Mar. 3, 1964

3,123,556
SEWAGE TREATMENT PLANTS
Joseph J. Gilbert, Abington, Pa., assignor to Link-Belt Company, a corporation of Illinois
Filed Feb. 8, 1961, Ser. No. 87,957
8 Claims. (Cl. 210—151)

The present invention relates to improvements in sewage treatment plants. The invention is more particularly concerned with improvements in sewage treatment plants utilizing a well-known bio-filtration process.

There is a need for compact sewage treatment plants capable of operating efficiently and at low cost. This need exists in small communities and at institutions and establishments remote from metropolitan sewage disposal service. The primary object of the present invention is to provide such plants.

Another object of the invention is to provide a highly compact sewage treatment plant which is capable of maintaining a uniformly stable effluent.

Another object of the invention is to provide a sewage treatment plant which can be easily and inexpensively installed, which is almost fully automatic in its operation, and which requires only the part-time attention of an unskilled operator.

Another object of the invention is to provide such a sewage treatment plant which has low power requirements to thereby further reduce the cost of operation.

Still another object of the invention is to provide a sewage treatment plant which has the ability to readily absorb temporary shock loads.

The well-known bio-filtration sewage treatment process involves the preliminary removal of settleable solids from the liquid sewage in a settling compartment. Liquid sewage from the settling compartment, which may still contain some unsettled solids, is distributed over the surface of a filter bed. Aerobic bacteria are effective in the filter bed to remove from 85% to 95% of the suspended solids and the bio-chemical oxygen demand. The liquid sewage may be recirculated through the filter bed. A stable effluent is removed from the upper surface of the liquid in the settling compartment. The settleable solids are collected and digested in a sludge digester from which the digested sludge is removed.

Sewage treatment plants embodying the present invention utilize a bio-filtration process with novel features and equipment which are described below. The sewage treatment plant may be briefly described as including an annular primary settling chamber and an annular final settling chamber which surrounds and is concentric to the primary settling chamber. An annular primary filter bed is positioned above and concentric to the primary settling chamber. An annular secondary filter bed surrounds the primary filter bed and is positioned above the final settling chamber. The lower ends of the two settling chambers are in open communication with each other. A digester chamber is positioned below the settling chambers for receiving solids settling from the sewage in the settling chambers. Sewage influent is delivered into the primary settling chamber in which the settleable solids settle out and pass to the digester chamber to be digested. Liquid from the upper surface of that in the primary settling chamber is pumped upwardly and is distributed onto the upper surface of the primary filter bed. The filtrate from the primary filter bed is divided into two components. One component of this filtrate is returned by gravity flow to the primary settling chamber. The other component of the filtrate from the primary filter bed is combined with liquid drawn from the final settling chamber and the thus combined liquids are distributed over the upper surface of the secondary filter bed. The filtrate from the secondary filter bed passes by gravity flow to the final settling chamber. A uniformly stable effluent is discharged from the upper surface of the liquid in the final settling chamber. Digested sludge is removed from the digester chamber.

The invention is more fully described with reference to the accompanying drawings, wherein:

FIGURE 2 is a vertical sectional view of the plant shown in FIGURE 1;

FIGURE 3 is a perspective view of a portion of the apparatus which includes a central rotatable assembly and certain parts cooperating therewith;

FIGURE 4 is a horizontal sectional view taken generally in the direction of the arrows along the line 4—4 of FIGURE 2;

FIGURE 5 is a horizontal sectional view taken generally in the direction of the arrows along the line 5—5 of FIGURE 2;

FIGURE 6 is a horizontal sectional view taken generally in the direction of the arrows along the line 6—6 of FIGURE 2;

FIGURE 7 is a fragmentary sectional view taken in the direction of the arrows along the line 7—7 of FIGURE 6;

FIGURE 8 is a fragmentary sectional view taken in the direction of the arrows along the line 8—8 of FIGURE 5;

FIGURE 9 is a fragmentary view taken generally in the direction of the arrows along the line 9—9 of FIGURE 5.

Figure 1:
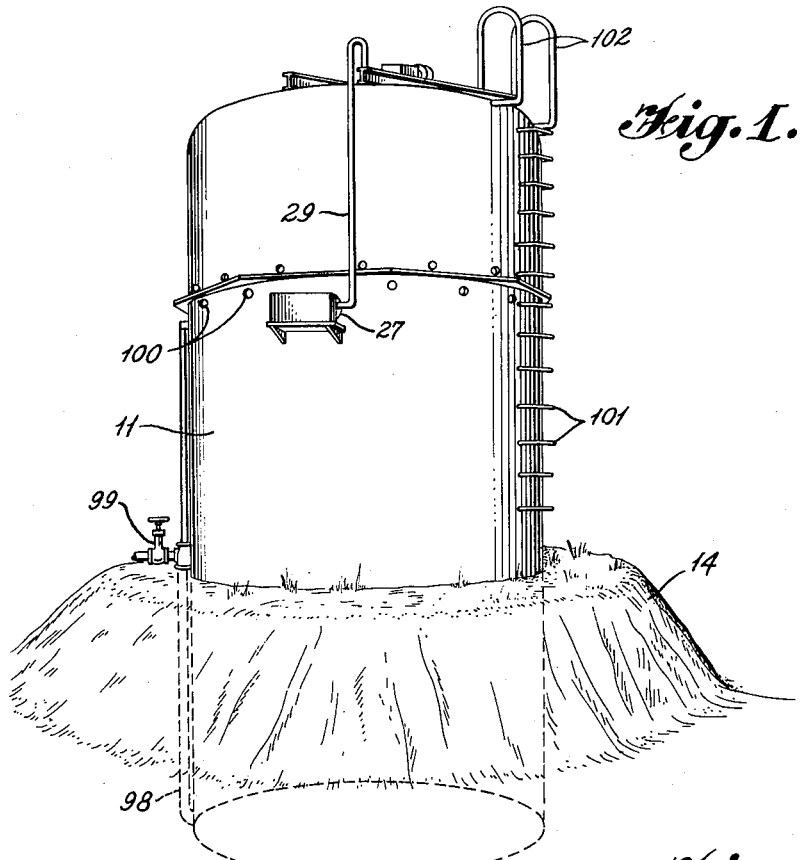
FIGURE 1 is a perspective view of an installed sewage treatment plant embodying the invention.

The equipment includes a vertical housing 11 having a bottom 12. The housing may be positioned on a suitable base 13 within an excavation in the earth. Alternatively, the base 13 may be at ground level. If desired, earth grading 14 may be used to conceal the lower portion of the housing, and to insulate the contents of the digester from freezing temperatures. The housing 11 is substantially open to atmospheric air at its top.

The sewage influent may flow by gravity or may be pumped through an influent line 15 into the annular space between a central tubular member 16 and a concentric tubular baffle member 17. The tubular members 16 and 17 are supported by radially extending arms 18 and 19, which are secured to the interior of the housing 11. Sewage influent discharged from the line 15 flows downwardly between the tubular members 16 and 17 and enters a primary settling chamber 20. This flow is indicated by the arrows 21. The sewage within the primary settling chamber 20 contains settleable solids which settle through the open bottom of the primary settling chamber and eventually pass into a digester chamber in the manner hereinafter described. The outer peripheral wall of the primary settling chamber 20 is designated by the reference numeral 22. An inwardly extending shelf 23 is secured to the inner surface of the wall 22 and cooperates with a perforated wall 24 to provide a trough 25. Sewage containing some suspended solids leaves the primary settling chamber 20 through the perforations 26 in the wall 24 and enters the trough 25. A primary recirculation pump 27 draws sewage from the trough 25 through a conduit 28 and pumps this liquid through a primary recirculation conduit 29 to a central distribution chamber 30 of a rotary distributor head which is designated generally by the reference numeral 31. Nozzle carrying conduits 32 communicate with and radiate from the distribution chamber 30. The nozzle carrying conduits 32 are provided with nozzles 33 which discharge the liquid sewage for distribution onto the upper surface of a primary filter bed 34. The primary filter bed 34 is of annular form and may comprise crushed stone disposed between concentric walls 35 and 36 and above a perforated bottom wall 37. The liquid sewage is subjected to the action of aerobic bacteria in the primary filter bed 34 which removes a portion of the suspended solids and the biochemical oxygen demand.

A plate 38 is positioned beneath the perforated bottom wall 37 of the primary filter bed 34 and is supported by the walls of the housing 11. An annular partition 39 is provided on the upper surface of the plate 38 and serves to divide the filtrate from the primary filter bed 34 into two components. The first of these components passes through openings 40 in the plate 38 and into the annular space between the tubular members 16 and 17 from which it eventually returns to the primary settling chamber 20, as indicated by the arrows 21. The second component of the filtrate from the primary filter bed 34 passes through a conduit 41 to a secondary recirculation pump 42, the purpose of which is described below.

A final settling chamber is designated by the reference numeral 43. The final settling chamber is defined by a cylindrical baffle wall 44, which is concentric to the wall 22, and by the wall of the housing 11. A shelf 45 is secured to the wall of the housing 11 and supports a notched weir plate 46. As best illustrated in FIGURES 8 and 9, the weir plate 46 has elongated slots 47 therein through which pass retaining bolts 48 for securing the weir plate to the shelf 45. The elongated slots 47 permit limited vertical adjustment of the weir plate 46 which is effective to control the liquid level within the final settling chamber 43. It will be noted that the primary settling chamber 20 and the final settling chamber 43 are in open communication at their lower portions so the control of the elevation of the weir plate 46 also controls the liquid level in the primary settling chamber 20. This liquid level is designated by the water-level line 49 in FIGURE 2.

Additional solids will settle from the liquids in the final settling chamber 43 and will eventually reach the digester chamber in the manner described below.

A conduit 50 leads from the final settling chamber 43 to the fluid line 41 which communicates with the intake of the secondary recirculation pump 42. The above mentioned second component of the filtrate from the primary bed 34 is thus combined with liquid from the final settling chamber and is pumped by means of the pump 42 through a secondary recirculation line 51 to an annular distribution chamber 52 associated with the rotary distributor 31. Nozzle carrying conduits 53 and 54 communicate with and radiate from the distribution chamber 52. The conduits 53 and 54 are provided with nozzles 55 which discharge liquid onto the upper surface of a secondary filter bed 56. The secondary filter bed 56 may be of crushed stone and is arranged in concentric relationship to the primary filter bed 34. The crushed stone of the secondary filter bed is confined by the annular wall 36, the wall of the housing 11, and a perforated bottom 57. The filtrate from the secondary filter bed 56 passes through the perforated bottom 57 and onto the upper surface of the plate 38, from which it drains through openings 58 into the space between the tubular members 22 and 44. The filtrate from the secondary filter 56 is thus returned to the final settling chamber 43 by passing beneath the lower end of the tubular baffle member 44.

The effluent from the system leaves the upper portion of the liquid in the final settling chamber 43 through the notches in the weir plate 46 and passes into a trough formed by the shelf 45. This effluent then passes through an effluent outlet line 59. The effluent will be found to be uniformly stable. The effluent may be subjected to subsequent chlorination, if such seems necessary or desirable.

The rotary distributor 31 is fixed to the upper end of a vertical shaft 60 which extends centrally through the apparatus. A hoop 61 is fixed to the nozzle carrying conduits 31, 32, 53 and 54 in concentric relationship to the shaft 60. A drive head designated generally by the reference numeral 62 drives a friction wheel 63 which engages the hoop 61 to rotate the spray head 31 and the shaft 60.

The shaft 60 is supported near its upper end by a bearing 64 carried by a plate 65 secured to the tubular member 35. The lower end of the shaft 60 is supported by a bearing 66 secured to the bottom 12 of the housing 11. A plurality of arms 67 are secured to and radiate from the shaft 60. The arms 67 support a slightly frusto-conical separator floor 68 which rotates with the shaft 60. Solids settling from the primary settling chamber 20 are deposited on the upper surface of the floor 68. A stationary scraper 69 is secured by means of brackets 69a to one of the radial arms 19. The scraper 69 is positioned just above the upper surface of the sloping floor 68 and serves to scrape solids accumulating on that floor toward the periphery thereof. To assist in accomplishing this objective the scraper 69 extends at a slight angle to the radial, as best shown in FIGURE 6. The solids scraped from the floor 68 by the scraper 69 fall into an annular trough 70. The trough 70 is formed by a downwardly and inwardly sloping annular wall 71, a bottom wall 72 and an inner vertical wall 73. It will be seen that the tubular member 22 extends outwardly and downwardly at 74 to approach the wall 71. Solids settling from the final settling chamber 43 pass between the wall 74 and the wall 71 to enter the trough 70.

The periphery of the separator floor 68 is provided with a downwardly extending flange 75 which is positioned in the trough 70. The flange 75 carries a plurality of downwardly and forwardly extending scoop-like elements 76 which are best illustrated in FIGURES 6 and 7. These scooplike elements scoop solids from the trough 70 over the upper edge of the vertical wall 73 of that trough and into a digester chamber 77.

The radiating arms 67 which support the separator floor 68 have a plurality of radially spaced scum breaker elements 78 depending therefrom. A stationary supporting member 79 is secured to the wall 73 and carries a plurality of upwardly extending radially spaced scum breaker elements 80 between which the scum breaker elements 78 are arranged to pass. Scum accumulating in the upper portion of the digester chamber 77 is effectively broken up by the relative movement of the scum breaker elements 78 and 80. The supporting member 79 also carries a bearing member 81 which serves to support the intermediate portion of the shaft 60.

A generally tubular member 82 is secured to the shaft 60 by means of radial wings 83. The spaces between the wings 83 permit the escape of gas through the tubular members 82 and 35 to atmosphere. The lower end of the tubular member 82 is bell-shaped at 84 and surrounds the upper end of the central tubular member 16 below the liquid level line 49. Arms 85 and 86 radiate from the bell-shaped end 84 of the tubular member 82. The arms 85 and 86 carry plow-shaped scum collector blades 87 which serve to convey the scum accumulating on the upper surface of the liquid in the primary settling chamber 20 to the scum funnel 93.

A scum pump 88 has an inlet line 89. One branch of the inlet line 89 is designated by the reference numeral 90 and communicates with a scum funnel 91 within the tubular member 16. A second branch 92 of the line 89 communicates with a scum funnel 93 within the primary settling chamber 20. The scum is discharged from the pump 88 through an outlet line 94 into the digester chamber 77.

Sludge is digested in the digester chamber and accumulates on the bottom 12 of the housing. The shaft 60 drives radially extending rake arms 95 and 96 which are provided with sludge rake members 97. The rake members 97 are sloped slightly inwardly, as illustrated in FIGURES 2 and 3, to move the accumulated sludge toward the periphery of the housing 11. A sludge drawoff line 98 communicates with the bottom of the digester chamber 77 and is controlled by a sludge drawoff valve 99.

Openings 100 in the housing 11 are for visual inspection of the water level 49 and adjustment of the weir plates 46 within the housing.

The housing 11 may be provided with steps 101 and hand rails 102 for convenient access to the filter beds and the spray head.

Figure 10:
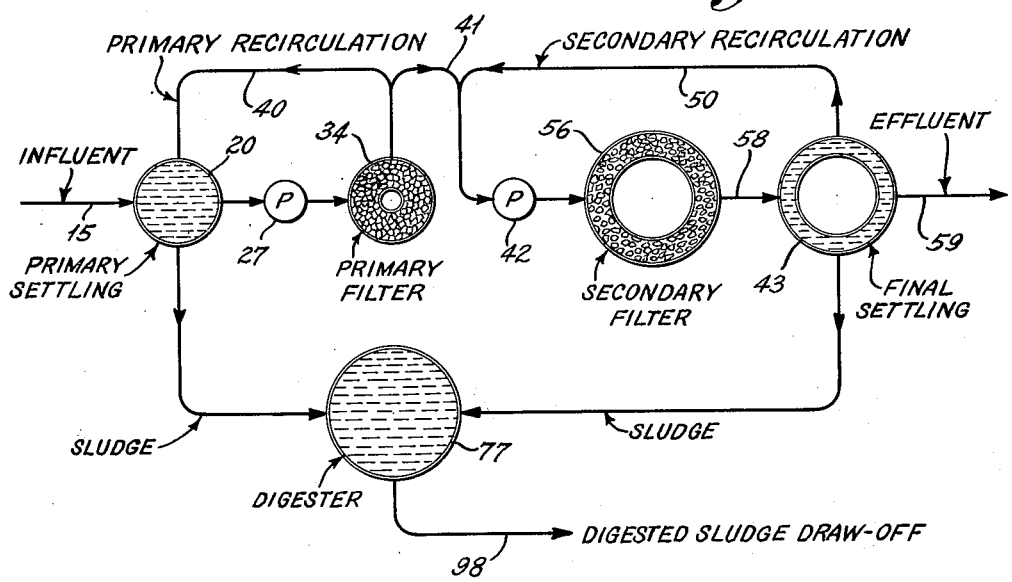
FIGURE 10 is a flow diagram depicting the various stages of flow in the equipment.

The operation of the equipment has been described in connection with the description of its various components. It may be helpful, however, to briefly summarize the operation by reference to the flow diagram of FIGURE 10. The influent enters the primary settling chamber 20 through the line 15. Settleable solids settle from the liquid in the primary settling chamber and pass into the digester chamber 77. Liquid containing some suspended solids passes from the primary settling chamber to be pumped by the primary recirculation pump 27 to be discharged as a spray onto the primary filter bed 34. One component of the filtrate from the primary filter bed 34 passes back into the primary settling chamber through the openings 40. The other component of the filtrate from the primary filter bed 34 passes through conduit 41 and is combined with liquid passing through the conduit 50 from the final settling chamber 43. This combined liquid is pumped by means of the secondary recirculation pump 42 to be discharged as a spray onto the secondary filter bed 56. The filtrate from the secondary filter bed 56 is returned to the final settling chamber through opening 58. Solids settling from the liquid in the final settling chamber pass into the digester chamber 77. A uniformly stable effluent passes from the final settling chamber through the effluent line 59. The sludge is digested in the digester chamber 77 and is periodically withdrawn through the sludge drawoff line 98.

It will be seen that the primary and final settling chambers are concentric to each other. The primary and secondary filter beds are similarly concentric and are positioned above the primary and final settling chambers respectively. The spray nozzles 33 travel in a path which is concentric to the primary filter bed 34. The discharge nozzles 55 travel in a path which is concentric to the secondary filter bed 56. The passage of liquid from the filter beds to the settling chambers is by gravity flow. A single drive unit is used to rotate the rotary distributor 31, the scum collector blades 87 and breaker elements 78, the rotating separator floor 68 and the sludge rakes 97. The foregoing features contribute greatly to the compactness of the equipment and to its low power demand.

The combination of settling and two stage filtration with recirculation assures a uniformly stable effluent even under adverse conditions or temporary shock loads.

I have illustrated and described what I now consider to be the preferred embodiment of my invention. It will be understood, however, that various alterations and modifications may be made without departing from the broader scope of the invention which is defined by the claims.

Having thus described my invention, I claim:

1. Bio-filtration apparatus comprising an annular primary settling chamber, means for introducing liquid sewage influent into said primary settling chamber, an annular final settling chamber concentric to said primary settling chamber, a digester chamber below and in communication with said settling chambers for receiving sludge settling from the liquid sewage in said settling chambers, an annular primary filter bed above said primary settling chamber, an annular secondary filter bed concentric to said primary filter bed, rotatable means for conducting liquid sewage from said primary settling chamber and for uniformly distributing the same onto the upper surface of said primary filter bed, means for dividing the filtrate from said primary filter bed into two components and for returning one such component to said primary settling chamber, means for combining the entire quantity of the other such component with liquid drawn from said final settling chamber, rotatable means for conducting the thus combined liquids and for uniformly distributing the same onto the upper surface of said secondary filter bed, means for conveying the filtrate from said secondary filter bed to said final settling chamber, an effluent discharge from the upper surface of the liquid in said final settling chamber, and means for removing digested sludge from said digester chamber.

2. Bio-filtration apparatus comprising an annular primary settling chamber, means for introducing liquid sewage influence into said primary settling chamber, an annular final settling chamber concentric to and surrounding said primary settling chamber, a digester chamber below and in communication with said settling chambers for receiving sludge settling from the liquid sewage in said settling chambers, an annular primary filter bed above said primary settling chamber, a secondary filter bed concentric to and surrounding said primary filter bed, means for pumping liquid sewage from said primary settling chamber, rotatable means for uniformly distributing said pumped sewage onto the upper surface of said primary filter bed, means for dividing the filtrate from said primary filter bed into two components and for returning one such component by gravity flow to said primary settling chamber, means for combining the entire quantity of the other such component with liquid drawn from said final settling chamber and for pumping the thus combined liquids under pressure, rotatable means for uniformly distributing said combined liquids onto the upper surface of said secondary filter bed, means for conveying the filtrate from said secondary filter bed by gravity flow to said final settling chamber, means for discharging effluent from the upper portion of the liquid in said final settling chamber, and means for removing digested sludge from said digester.

3. Bio-filtration apparatus comprising an annular primary settling chamber, means for introducing liquid sewage influent into said primary settling chamber, an annular final settling chamber concentric to and surrounding said primary settling chamber, a digester chamber below and in communication with said settling chambers for receiving sludge settling from the liquid sewage in said settling chambers, an annular primary filter bed above said primary settling chamber, a secondary filter bed concentric to and surrounding said primary filter bed, a rotary distributor positioned above said filter beds and rotatable about the axis thereof, said distributor having first distribution means movable above the upper surface of said primary filter bed and having second distribution means movable above the upper surface of said secondary filter bed, means for pumping liquid sewage from said primary settling chamber and for uniformly distributing the same through said first distribution means onto the upper surface of said primary filter bed, means for dividing the filtrate from said primary filter bed into two components and for returning one such component to said primary settling chamber, means for combining the entire quantity of the other such component with liquid drawn from said final settling chamber and for pumping the thus combined liquids and for uniformly distributing the same through said second distribution means onto the upper surface of said secondary filter bed, means for conveying the filtrate from said secondary filter bed to said final settling chamber, and means for discharging effluent from the upper surface of said final settling chamber.

4. Bio-filtration apparatus comprising an annular primary settling chamber, means for introducing liquid sewage influent into said primary settling chamber, an annular final settling chamber concentric to and surrounding said primary settling chamber, a digester chamber below and in communication with said settling chambers for receiving solids settling from the liquid sewage in said settling chambers, an annular primary filter bed above said primary settling chamber, a secondary filter bed concentric to and surrounding said primary filter bed, a vertical shaft extending along the common axis of said settling chambers and said filter beds, a rotary distributor mounted on said shaft for rotation above said filter beds, and being rotatable about the common axis thereof, said distributor having first distribution means movable above said primary filter bed and having second distribution means movable above said secondary filter bed, means for pumping liquid sewage from said primary settling chamber and for uniformly distributing the same from said first distribution means onto the upper surface of said primary filter bed, means for dividing the filtrate from said primary filter bed into two components and for returning one such component by gravity flow to said primary settling chamber, means for combining the entire quantity of the other such component with liquid sewage from said final settling chamber and for pumping the thus combined liquid to uniformly distribute the same from said second distribution means onto the upper surface of said secondary filter bed, means for conveying the filtrate from said secondary filter bed by gravity flow to said final settling chamber, means for rotating said rotary distributor, means for discharging effluent from the upper surface of the liquid in said final settling chamber, and means for removing digested sludge from said digester.

5. Bio-filtration apparatus comprising an annular primary settling chamber, means for introducing liquid sewage influent into said primary settling chamber, an annular final settling chamber concentric to and surrounding said primary settling chamber, an annular primary filter bed above said primary settling chamber, a secondary filter bed concentric to and surrounding said primary filter bed, a vertical shaft extending along the common axis of said settling chambers and said filter beds, a distributor mounted on said shaft for rotation above said filter beds, said distributor having first distribution means above said primary filter bed and having second distribution means above said secondary filter bed, means for pumping liquid sewage from said primary settling chamber and for uniformly distributing the same from said first distribution means onto the upper surface of said primary filter bed, means for dividing the filtrate from said primary filter bed into two components and for returning one such component by gravity flow to said primary settling chamber, means for combining the entire quantity of the other such component with liquid sewage from said final settling chamber and for pumping the thus combined liquids to uniformly distribute the same from said second distribution means onto the upper surface of said secondary filter bed, means for conveying the filtrate from said secondary filter bed by gravity flow to said final settling chamber, and means for rotating said shaft to thereby rotate said distributor.

6. Bio-filtration apparatus comprising an annular primary settling chamber, means for introducing liquid sewage influent into said primary settling chamber, an annular final settling chamber concentric to and surrounding said primary settling chamber, an annular primary filter bed above said primary settling chamber, a secondary filter bed concentric to and surrounding said primary filter bed, a vertical shaft extending along the common axis of said settling chambers and said filter beds, a distributor mounted on said shaft for rotation above said filter beds, said distributor having first distribution means above said primary filter bed and having second distribution means above said secondary filter bed, means for pumping liquid sewage from said primary settling chamber and for uniformly distributing the same from said first distribution means onto the upper surface of said primary filter bed, means for dividing the filtrate from said primary filter bed into two components and for returning one such component by gravity flow to said primary settling chamber, means for combining the entire quantity of the other such component with liquid sewage from said final settling chamber and for pumping the thus combined liquids to uniformly distribute the same from said second distribution means onto the upper surface of said secondary filter bed, means for conveying the filtrate from said secondary filter bed by gravity flow to said final settling chamber, a scum collector fixed to said shaft for movement through the upper portion of said primary settling chamber to collect the scum therein, means for rotating said shaft to thereby rotate said distributor and said scum collector, means for discharging effluent from the upper surface of the liquid in said final settling chamber, and means for removing scum collected by said scum collector.

7. Bio-filtration apparatus comprising an annular primary settling chamber, means for introducing liquid sewage influent into said primary settling chamber, an annular final settling chamber concentric to said primary settling chamber, a digester chamber below and in communication with said settling chambers for receiving sludge settling from the liquid sewage in said settling chambers, an annular primary filter bed above said primary settling chamber, a secondary filter bed concentric to said primary filter bed, a vertical shaft extending along the common axis of said settling chambers and said filter beds, a distributor mounted on said shaft for rotation above said filter beds, said distributor having first distribution means above said primary filter bed and having second distribution means above said secondary filter bed, means for pumping liquid sewage from said primary settling chamber and for uniformly distributing the same from said first distribution means onto the upper surface of said primary filter bed, means for dividing the filtrate from said primary filter bed into two components and for returning one such component by gravity flow to said primary settling chamber, means for combining the entire quantity of the other such component with liquid from said final settling chamber and for pumping the thus combined liquids to uniformly distribute the same from said second distribution means onto the upper surface of said secondary filter bed, means for conveying the filtrate from said secondary filter bed by gravity flow to said final settling chamber, a floor fixed to said shaft between said primary settling chamber and said digester chamber and providing a restricted passageway between said chambers at its periphery, means for rotating said shaft to thereby rotate said distributor and said floor, a stationary scraper above and adjacent to said floor and arranged to scrape material accumulating on the floor toward the periphery thereof for delivery into said digester chamber, a scum breaker in the upper portion of said digester chamber, said scum breaker including radially spaced breaker elements beneath said floor and rotating therewith and also including radially spaced stationary breaker elements between which said first named breaker elements pass, means for discharging effluent from the upper surface of the liquid in said final settling chamber, and means for removing digested sludge from said digester chamber.

8. Bio-filtration apparatus comprising an annular primary settling chamber, means for introducing liquid sewage influent into said primary settling chamber, an annular final settling chamber concentric to said primary settling chamber, a digester chamber below and in communication with said settling chambers for receiving solids settling from the liquid sewage in said settling chambers, an annular primary filter bed above said primary settling chamber, a secondary filter bed concentric to said primary filter bed, means for pumping liquid sewage from said primary settling chamber and uniformly distributing the same onto the upper surface of said primary filter bed, means for dividing the filtrate from said primary filter bed into two components and for returning one such component by gravity flow to a lower portion of said primary settling chamber, means for combining the entire quantity of the other such component with liquid sewage from said final settling chamber and for pumping the thus combined liquids to uniformly distribute the same onto the upper surface of said secondary filter bed, means for conveying the filtrate from said secondary filter bed by gravity flow to said final settling chamber, means for discharging effluent from the upper surface of the liquid in said final settling chamber, and means for removing sludge from said digester chamber.

References Cited in the file of this patent

UNITED STATES PATENTS

| | | |
|---|---|---|
| Re. 22,652 | Reybold et al. | June 26, 1945 |
| 1,794,374 | Graham et al. | Mar. 3, 1931 |
| 2,129,181 | Morse | Sept. 6, 1938 |
| 2,348,126 | Green | May 2, 1944 |
| 2,355,760 | Trebler | Aug. 15, 1944 |
| 2,553,228 | Yonner | May 15, 1951 |
| 2,580,764 | Gunz | Jan. 1, 1952 |
| 2,801,007 | Thompson | July 30, 1957 |
| 2,901,114 | Smith et al. | Aug. 25, 1959 |
| 3,010,581 | Knapp et al. | Nov. 28, 1961 |

OTHER REFERENCES

Publication, Guy Browning Arthur, "Biofiltration Serves a Growing City," published by the Door Company, reprinted from Public Works Magazine for April 1954, 2 pp.